(12) United States Patent
Kannankeril

(10) Patent No.: US 6,852,391 B2
(45) Date of Patent: Feb. 8, 2005

(54) INSULATING COMPOSITE MATERIALS AND METHODS FOR PRODUCING AND USING SAME

(75) Inventor: Charles Kannankeril, North Caldwell, NJ (US)

(73) Assignee: Sealed Air Corporation (US), Saddle Brook, NJ (US)

( * ) Notice: Subject to any disclaimer, the term of this patent is extended or adjusted under 35 U.S.C. 154(b) by 0 days.

(21) Appl. No.: 09/998,807

(22) Filed: Nov. 1, 2001

(65) Prior Publication Data

US 2002/0058126 A1 May 16, 2002

Related U.S. Application Data

(60) Provisional application No. 60/248,306, filed on Nov. 14, 2000.

(51) Int. Cl.[7] .............................. B32B 3/00; B32B 3/12; B32B 1/00
(52) U.S. Cl. ...................... 428/166; 428/158; 428/178; 428/72; 428/76; 428/458; 428/174
(58) Field of Search .................................. 428/166, 178, 428/72, 76, 458, 174, 182, 158

(56) References Cited

U.S. PATENT DOCUMENTS

| | | |
|---|---|---|
| 2,585,915 A | 2/1952 | Chavannes |
| 2,776,451 A | 1/1957 | Chavannes |
| 2,776,452 A | 1/1957 | Chavannes |
| 3,026,231 A | 3/1962 | Chavannes |
| 3,142,599 A | 7/1964 | Chavannes |
| 3,208,898 A | 9/1965 | Chavannes et al. |
| 3,285,793 A | 11/1966 | Chavannes |
| 3,294,387 A | 12/1966 | Chavannes |
| 3,405,020 A | 10/1968 | Chavannes |
| 3,416,984 A | 12/1968 | Chavannes et al. |
| 4,344,536 A * | 8/1982 | Oberhuber ................... 206/594 |
| 4,401,706 A * | 8/1983 | Sovilla ........................ 428/158 |
| 4,628,549 A | 12/1986 | Lazar |
| 5,116,444 A | 5/1992 | Fox |
| 6,355,333 B1 * | 3/2002 | Waggoner et al. ........... 428/174 |
| 6,514,596 B1 * | 2/2003 | Orologio ..................... 428/166 |

OTHER PUBLICATIONS

Derwent Abstract of HP 11000956A.*

* cited by examiner

Primary Examiner—Terrel Morris
Assistant Examiner—Victor S Chang
(74) Attorney, Agent, or Firm—Daniel B. Rubie

(57) ABSTRACT

A composite material wherein one or more backing materials are disposed in generally contiguous relation to an insulating material. Methods for forming composite materials comprising securing one or more backing materials to an insulating material such that the backing materials are in generally contiguous relation to the insulating material. Methods for using the composite materials of the present invention wherein a structure is wrapped with a composite material of the present invention.

26 Claims, 2 Drawing Sheets

INSULATING COMPOSITE MATERIALS AND METHODS FOR PRODUCING AND USING SAME

This application claims priority from and the benefit of U.S. Provisional Patent Application Ser. No. 60/248,306 filed Nov. 14, 2000, which is incorporated herein in its entirety by reference.

FIELD OF THE INVENTION

The present invention relates to composite materials and methods for making and using the same. In particular, the present invention relates to composite materials providing insulating properties and methods for making and using the same.

BACKGROUND OF THE INVENTION

With the ever rising costs of heating and the increasing emphasis on conservation of natural resources, there is a continued need to provide improved building materials for insulating edifices. Such building materials should be inexpensive to manufacture and easy to install. The building materials should also provide additional beneficial and desirable characteristics such as non-abrasiveness, softness, hydrophilicity, hydrophobicity, breathability, opacity, ultraviolet reflectivity, heat reflectivity, and/or toughness.

SUMMARY OF THE INVENTION

In one of its aspects, the present invention relates to a composite material comprising one or more backing materials disposed in generally contiguous relation to an insulating material. The insulating material comprises a foam, a fiberglass mat, a macerated paper mat, a cork mat, or an air cellular material.

In another of its aspects, the present invention relates to a method of forming a composite material wherein an insulating material and one ore more backing materials are secured such that the backing materials are in generally superposed, contiguous relation to the insulating material.

In yet another of its aspects, the present invention relates to a method for insulating a structure wherein the structure is wrapped with a composite material of the present invention.

Additional features and embodiments of the present invention will become apparent to those skilled in the art in view of the ensuing disclosure and appended claims.

BRIEF DESCRIPTION OF THE DRAWINGS

The numerous objects and advantages of the present invention may be better understood by those skilled in the art by reference to the accompanying detailed description and the following drawings, in which.

DETAILED DESCRIPTION OF THE INVENTION

Figure 1:
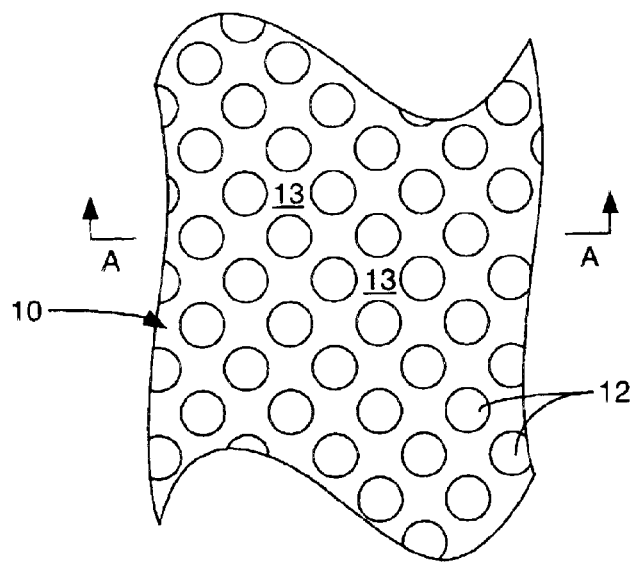
FIG. 1 is a top plan view of a section of composite material in accordance with the present invention.
Figure 2:
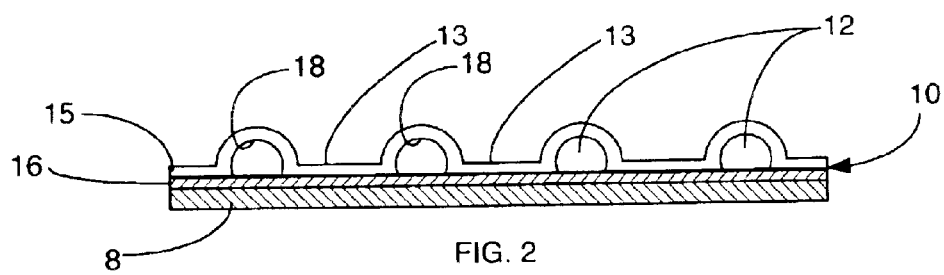
FIG. 2 is an enlarged cross-sectional view of the composite material of FIG. 1 taken along the A—A line.

In one of its aspects, the present invention relates to composite materials comprising a backing material disposed in generally contiguous relation to an insulating material. In the embodiment depicted in FIGS. 1 and 2, the insulating material 10 comprises an air cellular material. The air cellular material defines a plurality of gas-filled cavities 12 having land areas 13 separating the cavities 12. As best shown in FIG. 2, the air cellular material comprises first and second thermoplastic films, 15 and 16, respectively. A plurality of spaced apart concave sections 18 are formed in the first thermoplastic film 15. The second thermoplastic film 16 is superposed onto the first thermoplastic film 15 and secured to the land areas 13 between and around the concave sections 18. The second thermoplastic film 16 thereby covers the concave sections 18 to form the gas-filled cavities 12. The thermoplastic films, 15 and 16, are secured together using any of a variety of conventional techniques. For example, the thermoplastic films, 15 and 16, can be laminated (e.g., heat sealed) together to form the air cellular material.

However, the air cellular material may be formed in many different ways by different methods.

Examples of such methods are disclosed in U.S. Pat. Nos. 2,585,915; 2,776,451; 2,776,452; 3,026,231; 3,208,898; 3,285,793; 3,405,020; 3,416,984; and 5,116,444, each of which is incorporated herein by reference in its entirety. In one embodiment, the first and second thermoplastic films, 15 and 16, are coextruded to form the air cellular material in accordance with the method described in U.S. Pat. No. 5,116,444. Air cellular material is manufactured by a number of different manufacturers, including Sealed Air Corporation, the assignee of the present invention.

Suitable thermoplastic films include, but are not limited to, polyvinyl chloride films, polyvinylidene chloride films, olefinic polymer films, other coextruded films (e.g., films comprising nylon and/or similar barrier films), and combinations thereof. Suitable olefinic polymer films include, but are not limited to, polyethylene and polypropylene polymer films.

The gas-filled cavities 12 can be of a variety of sizes, shapes, and arrangements. However, the cavities 12 are generally hemispherical in shape having a diameter of between about 0.2 cm and about 4 cm, preferably between about 0.2 cm and about 2 cm. Further, the insulating properties of the composite material will be affected by the bubble height (larger bubble heights provide better insulation). Accordingly, although the bubble height can be varied over a considerable range, bubble heights of between about 1.5 mm and about 12.7 mm are preferred.

The backing material 8 is any of a variety of known materials which can be utilized to provide one or more characteristics desired for the composite material. Examples of characteristics which may be found desirable include, but are not limited to, non-abrasiveness, softness, hydrophilicity, hydrophobicity (i.e., moisture resistance), opacity, ultraviolet reflectivity, heat reflectivity, and toughness. In one embodiment, the backing material 8 comprises a material that acts as a moisture barrier by preventing or retarding water moisture from penetrating the backing material 8 while still enabling water vapor to pass through the backing material 8.

Suitable materials for the backing material 8 include, but are not limited to, fibrous and non-fibrous materials (e.g., thermoplastic materials comprising thermoplastic fibers such as olefinic polymer fibers (e.g., polyethylene and/or polypropylene fibers)), woven and non-woven materials, spun and non-spun materials, foils (e.g., metallic foils), and microporous films. In one particularly preferred embodiment, the backing material comprises TYVEK® (available from E.I. DuPont de Nemours & Co.). As is known to those of skill in the art, Tyvek® brand protective material is made from very fine, continuous, 100% high-density polyethylene fibers that are randomly distributed and non-directional and that are flash-spun and heat-bonded into a fabric that is permeable to air and water vapor, yet water-, chemical-, puncture-, tear-, and abrasion-resistant.

In another embodiment, the backing material 8 comprises a non-woven polyester material. The non-woven polyester material is optionally coated with a hydrophobic material to provide a backing material that is both breathable and moisture resistant.

Figure 6:
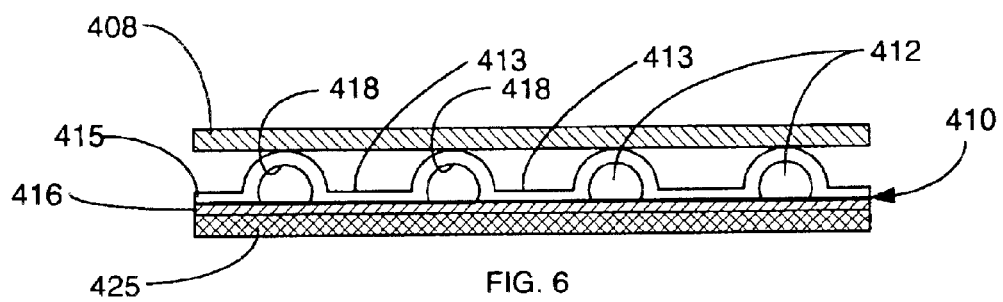
FIG. 6 is an enlarged cross-sectional view of yet a further alternate embodiment of the composite material of the present invention.

An alternate embodiment of the composite material is shown in FIG. 6. The composite material of FIG. 6 is in many respects similar to the composite material of FIG. 2. However, the backing material 408 of the composite material depicted in FIG. 6 is attached to the tips of the cavities 412. In addition, the composite material of FIG. 6 comprises a second backing material 425 secured to the second thermoplastic film 416 of the insulating material 410. The composite material of FIG. 6 is particularly useful for applications wherein a composite material having a combination of desired properties is required. For example, breathability and water-resistance can be provided by utilizing a backing material 408 comprising a breathable and water-resistant material (e.g., TYVEK®). At the same time, reflective insulation properties can be provided by utilizing a second backing material comprising a foil. One or both of the backing material 408 and the second backing material 425 optionally define perforations which are substantially similar to perforations 120 described in connection with FIG. 3 below.

Figure 3:
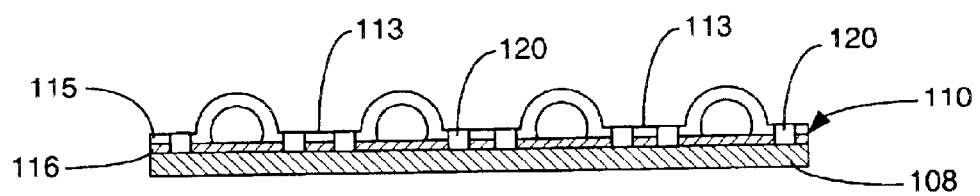
FIG. 3 is an enlarged cross-sectional view of an alternate embodiment of the composite material of the present invention.

Yet another alternate arrangement of the composite material is shown in FIG. 3. The first thermoplastic film 115, the second thermoplastic film, 116, and the backing material 108 of the composite material of FIG. 3 are essentially the same as the corresponding elements of the composite material of FIGS. 1 and 2. However, in the embodiment depicted in FIG. 3, perforations 120 are formed in the land areas 113 to more freely allow vapor to pass through the first and second thermoplastic films, 115 and 116, of the insulating material. The size and arrangement of the perforations 120 can vary depending upon the particular application for which the composite material is to be utilized. Typically, the perforations 120 are arranged substantially uniformly throughout the land areas 113 of the insulating material. The diameters of the perforations 120 are generally between about 0.001 mm and about 0.5 mm and, preferably, between about 0.01 mm and about 0.3 mm.

Figure 5:
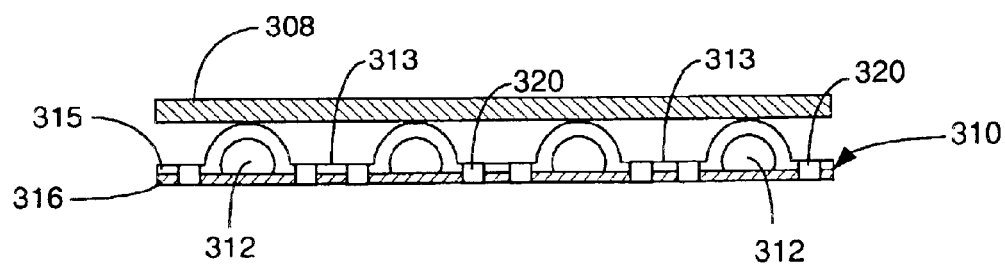
FIG. 5 is an enlarged cross-sectional view of still another alternate embodiment of the composite material of the present invention.

The embodiment of FIG. 5 is in many respects similar to the composite material of FIG. 3, except that the backing material 308 of the composite material depicted in FIG. 5 is attached to the tips of the cavities 312. The composite material of FIG. 5 therefore allows vapor passing through the perforations 320 to interact with a larger portion of the surface of the backing material 308. Accordingly, the embodiment of FIG. 5 is particularly useful for applications requiring a breathable composite material.

Figure 4:
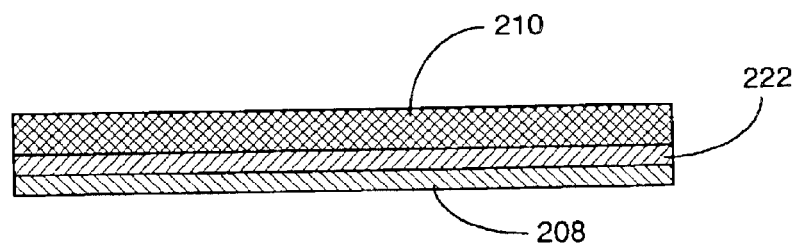
FIG. 4 is an enlarged cross-sectional view of a further embodiment of the composite material of the present invention.

In yet another alternate embodiment depicted in FIG. 4, the insulating material 210 comprises a foam, a fiberglass mat, a macerated paper mat, a cork mat, or other similarly insulative material. Suitable foams include, but are not limited to, polyolefin, polyurethane, polystyrene, open-cell, and closed-cell foams. When it is desired to provide a composite material that allows vapor to pass therethrough, the foam 210 is preferably an open-cell foam. Suitable open-cell foams include, but are not limited to, polyolefin, polyurethane, and polystyrene foams. Alternatively, the foam can be perforated to provide breathability.

The backing material, 8, 108, 208, 308 and 408, is disposed in generally contiguous relation to the insulating material, 10, 110, 210, 310 and 410, using any of a variety of techniques. For example, at least portions of the backing material and the insulating material can be laminated together. When both the insulating material and the backing material comprise similar materials (i.e., both comprise thermoplastics, or are otherwise compatible), the backing material preferably has a fusion temperature at least slightly above a fusion temperature associated with the insulating material. Accordingly, when both the insulating material and the backing material comprise thermoplastics, the insulating material preferably comprises a low density thermoplastic while the backing material preferably comprises a high density thermoplastic.

Alternatively, an adhesive can be utilized to secure at least portions of the backing material to the insulating material. Referring to FIG. 4, when used, the adhesive 222 is preferably applied as a separate layer between the insulating material 210 and the backing material 208. The adhesive used will depend, at least in part, on the composition of the backing and insulating materials as well as on the particular application for which the composite is to be used. For example, when the insulating material is a foam, suitable adhesives include, but are not limited to, hot melt adhesives (e.g., styrene block copolymer adhesives, ethylene-vinylacetate copolymer adhesives, and poly-alpha-olefin based adhesives), and water-based or solvent-based adhesives (e.g., acrylates and vinyl acetates). When it is desired to provide a composite material that allows vapor to pass therethrough, the adhesive is preferably a breathable adhesive such as a foamable adhesive (e.g., an adhesive that incorporates a blowing agent).

The backing material can be secured to the insulating material over substantially the entirety of the contiguous surfaces of the backing material and the insulating material. Alternatively, only portions of the backing material may be secured to the insulating material by, for example, intermittent heat sealing or the intermittent use of adhesive. When the backing material is applied to the tips of the cavities of an air cellular material, the adhesive is preferably applied only to the insulating material at the tips of the cavities.

In another of its aspects, the present invention relates to methods of forming composite materials wherein an insulating material and a backing material are secured together such that the backing material is in generally superposed, contiguous relation to the insulating material. The insulating material is formed by any of a number of methods. See, for example, U.S. Pat. Nos. 3,026,231; 3,142,599; 3,208,898; 3,294,387; and 3,416,984, each of which is incorporated herein by reference in its entirety. The composite material is then formed by attaching the backing material to the insulating material. In one embodiment, the composite material is formed by passing the insulating material and the backing material through a nip formed between two drums or rolls. The backing and/or insulating materials are optionally preheated prior to being fed between the drums. When the insulating material is formed from two separate laminated (e.g., heat sealed) films, the backing material is preferably laminated to the insulating material at substantially the same time that the films are laminated to form the insulating material.

In yet another of its aspects, the present invention relates to a method for insulating a structure with a composite material in accordance with the present invention. The method comprises the step of wrapping at least a portion of the structure with the composite material. The structure is preferably wrapped so that the composite material covers substantially all of the exterior surfaces of the structure with the insulating material adjacent the structure. The composite material is optionally secured to the structure using any of a variety of techniques. For example, the composite material can be nailed or tacked to the structure. Alternatively, an adhesive coating can be applied to the composite material along at least a portion of the surface of the composite material that contacts the structure to facilitate attachment of the composite material to the structure. In one particular embodiment, the composite material comprises a backing material that is breathable and moisture-resistant (e.g., TYVEK®). A composite material comprising a moisture-resistant backing material is particularly useful for wrapping structures such as buildings or edifices (e.g., dwellings or houses).

EXAMPLES

Composite materials in accordance with the present invention were prepared by securing sections of TYVEK® film to an air cellular material. The air cellular material was separately formed from coextruded thermoplastic films. The coextruded films each comprised a buried nylon barrier film sandwiched between polyethylene films. In a first example, the TYVEK® film was laminated to the tips of the bubbles of the air cellular material by heating the TYVEK® and the air cellular material with hot air to a temperature near the fusion temperature of the air cellular material. In a second example, the TYVEK® film was laminated to the tips of the bubbles of the air cellular material using a pressure sensitive adhesive.

Those skilled in the art will appreciate that numerous changes and modifications maybe made to the preferred embodiments of the invention and that such changes and modifications may be made without departing from the spirit of the invention. It is therefore intended that the appended claims cover all equivalent variations as fall within the true scope and spirit of the invention.

What is claimed is:

1. An article comprising:
    an insulating sheet comprising first and second films secured to each other at a plurality of land areas to define a plurality of gas-filled cavities between the first and second films, wherein the insulating sheet defines a plurality of perforations through the first and second films in the land areas allowing water vapor to pass through the insulating sheet; and
    a first backing sheet secured to the insulating sheet in generally contiguous relation to the insulating sheet, wherein the first backing sheet allows water vapor to pass through the first backing sheet while preventing liquid water from passing through the first backing sheet.

2. The article of claim 1 further comprising a second backing sheet secured to the insulating sheet in generally contiguous relation to the insulating sheet, wherein the second backing sheet allows water vapor to pass through the second backing sheet while preventing liquid water from passing through the second backing sheet.

3. The article of claim 2 wherein the insulating sheet is positioned between the first backing sheet and the second backing sheet.

4. The article of claim 1 wherein the first and second films comprise thermoplastic films and the first and second films are laminated together.

5. The article of claim 1 wherein one or more of the first and second films comprise a coextruded film.

6. The article of claim 1 wherein one or more of the first and second films comprises nylon.

7. The article of claim 1 wherein the first and second films comprise low density polyethylene.

8. The article of claim 1 wherein the first backing sheet comprises a thermoplastic polymer.

9. The article of claim 1 wherein the first backing sheet has a fusion temperature at least slightly above a fusion temperature associated with the first and second films.

10. The article of claim 1 wherein the first backing sheet comprises a high density polyethylene.

11. The article of claim 1 wherein the first or second films comprise a polymer selected from polyvinyl chloride polymer, polyvinylidene chloride polymer, and olefinic polymer.

12. The article of claim 11 wherein the olefinic polymer comprises polyethylene.

13. The article of claim 1 wherein the first backing sheet comprises a non-woven polyester.

14. The article of claim 1 wherein the first backing sheet comprises an olefinic polymer.

15. The article of claim 14 wherein the olefinic polymer comprises a polymer selected from one or more of polyethylene and polypropylene.

16. The article of claim 1 wherein the first backing sheet comprises thermoplastic fibers.

17. The article of claim 16 wherein the thermoplastic fibers comprise olefinic polymer fibers.

18. The article of claim 17 wherein the olefinic polymer fibers are selected from the group consisting of polyethylene fibers and polypropylene fibers.

19. The article of claim 1 wherein portions of the first backing sheet are laminated to the insulating sheet.

20. The article of claim 1 wherein portions of the first backing sheet and the insulating sheet are adhesively secured to each other.

21. The article of claim 1 comprising an adhesive along at least a portion of the insulating sheet for securing the article to a structure.

22. The article of claim 1 comprising an adhesive along at least a portion of the first backing sheet for securing the article to a structure.

23. A method of forming the article of claim 1 comprising the steps of:
    providing the insulating sheet;
    providing the first backing sheet; and
    securing the first backing sheet in generally superposed, contiguous relation to the insulating sheet.

24. A method for insulating a structure comprising the step of at least partially wrapping the structure with the article of claim 1.

25. The method of claim 24 wherein the article is secured to the structure with an adhesive.

26. The method of claim 24 wherein the structure comprises a building.

* * * * *